C. PEARSON.
TRACTOR HITCH FOR HARVESTING MACHINES.
APPLICATION FILED JAN. 12, 1916.
1,266,710.
Patented May 21, 1918.
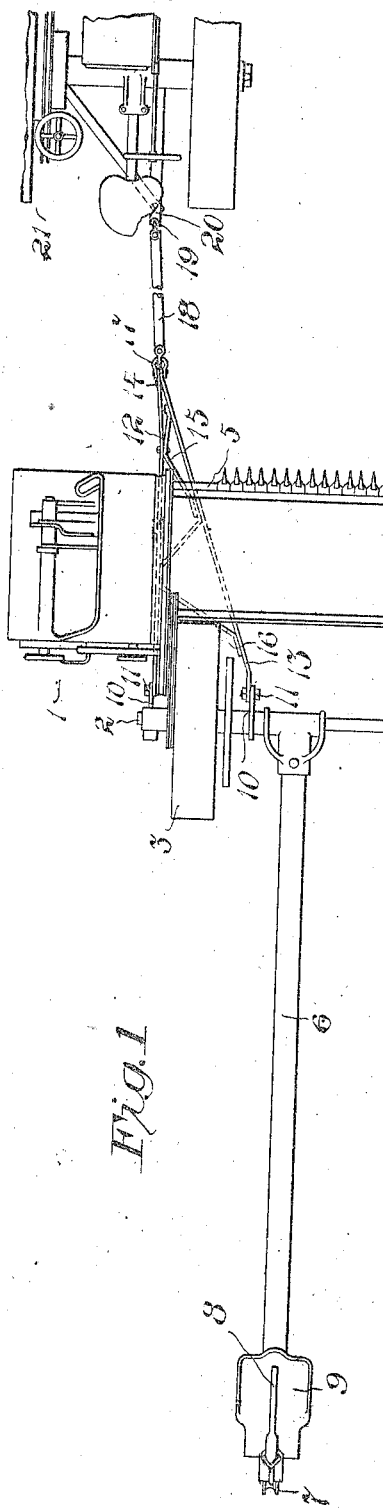
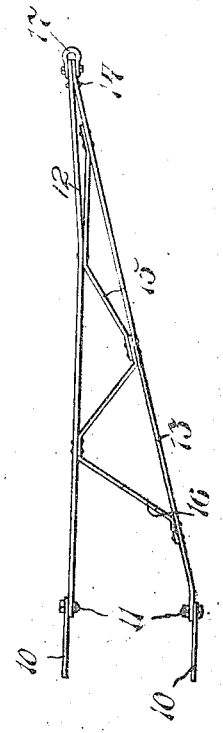
Inventor.
Charles Pearson.
By Chas. E. Lord
Atty.

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

TRACTOR-HITCH FOR HARVESTING-MACHINES.

1,266,710.

Specification of Letters Patent.

Patented May 21, 1918.

Application filed January 12, 1916. Serial No. 71,635.

*To all whom it may concern:*

Be it known that I, CHARLES PEARSON, a citizen of the United States, residing at Chicago, in the county of Cook and State of Illinois, have invented certain new and useful Improvements in Tractor-Hitches for Harvesting-Machines, of which the following is a full, clear, and exact specification.

My invention relates to tractor hitches for harvesting machines, and especially to tractor hitches for headers, header binders, or the like.

It has for its object to provide improved means whereby a harvesting machine; such, for example, as a header or header binder of the push type, may be attached to and drawn in the rear of a tractor. A further object of my invention is to provide improved draft connections between the drawn machine and the tractor whereby the draft is exerted in a manner to maintain the drawn machine in substantially the desired relation to the tractor and thereby minimize the amount of steering required to be done by the operator riding on the trailing machine. A more specific object of my invention is to provide improved draft connections which are flexible in such a manner that the machines may turn readily in the field and conform to the uneven surface of the ground, at the same time that the turning movement of the tractor is imparted to the header in an efficient manner.

In the accompanying drawings I have illustrated one embodiment which my invention may assume in practice.

In these drawings:

Figure 1 is a plan view of a tractor and header equipped with my improvement;

Fig. 2 is a detail side elevation of a part of the mechanism shown in Fig. 1;

Fig. 3 is a detail plan view of the draft member connected to the harvesting machine.

In the construction illustrated, it will be noted that a header binder of standard form is shown comprising a binding mechanism 1 mounted on an axle 2, which is in turn mounted at opposite ends upon a main wheel 3 and transport wheel 4. As in the usual construction, a grain platform 5 is disposed across the front of the frame and adjustably mounted on the axle 2 so that it may be used to cut grain of varying heights through suitable adjusting mechanism (not shown). At the rear of the frame the usual longitudinally disposed pipe 6 is provided, its rear end being supported upon a tiller or steering wheel 7 controllable through a tiller member 8 operable from the operator's platform 9. As in the usual construction, the controlling mechanism for the header or header binder is brought back to a point adjacent the operator's platform, but these connections have been omitted as they are well-known and have nothing to do with the draft connections.

In my improved construction forwardly and slightly downwardly extending arms 10 are rigidly connected to the axle 2 on opposite sides of the main wheel 3, and to these arms 10 are pivotally connected at 11 the upturned rear ends of horizontally disposed forwardly extending draft members 12 and 13, of which the member 12 is disposed substantially in the line of draft, while the member 13 is disposed diagonally in a stubbleward direction, both members being so disposed with respect to the platform that the horizontal portion thereof underlies the platform. As shown, these members 12 and 13 are extended slightly stubblewardly and their fronts are extended slightly upward and connected at 14, these members also being braced at points intermediate their ends by suitable substantially V-shaped horizontally disposed brace members 15 and 16 in such a manner as to produce an exceedingly rigid construction. Carried upon the front end 14 of the rigid draft member thus formed is a pivoted clevis member 17, to which is pivotally connected the rear end of a draft connection or link 18, which extends forward from its point of connection thereto in the line of draft and is connected at its front end at 19 to the draft bar 20 of a tractor 21, which latter may be of any desired construction.

In the operation of the device it is evident that as the tractor 21 is drawn forward in the field the draft will be exerted on opposite sides of the main wheel 3 of the header or header binder in such a manner as to maintain the latter machine in the desired position transversely of the line of draft and substantially in the desired trailing relation relative to the tractor, with the main wheel following in the track of the grainward tractor wheel. Obviously, the header may at all times be steered by the operator riding thereon, and he may throw the same into or out of the grain by rotatable movement of the tiller 8, and by the use of the same member may expedite the turning movement of the machine at the corners of the field. In making a turn it is also to be noted that through the relatively long tongue-like members 12 and 13, the turning movement of the tractor is transmitted to the trailing machine at a point a substantial distance in front of the main wheel in such a manner as to greatly facilitate and speed up the turning movement of the trailing machine. It will further be noted that by shaping the members 12 and 13 as shown they may pass under the platform 5 without conflicting therewith or without in any way interfering with the adjustment of the latter. Attention is also directed to the fact that the entire mechanism may be attached to or removed from a header or header binder of standard construction with great facility, it only being necessary to attach or remove the bolt connections 14, whereupon the header may be operated as a tractor drawn or push machine.

While I have in this application specifically described one embodiment which my invention may assume in practice, it is, of course, to be understood that the invention is not limited to the specific form illustrated, but that it may be modified to assume various other forms without departing from its spirit, it being my intention to include all such modifications within the scope of the appended claims.

What I claim as new is:

1. In combination, a harvesting machine having a main wheel journaled thereon, a platform disposed in front of said main wheel, and a rigid draft connection connected to said harvesting machine on opposite sides of said main wheel and extending forwardly beneath said platform.

2. In combination, a harvesting machine having a main wheel journaled thereon, a platform disposed in front of said main wheel, and rigid draft connections pivotally connected to said harvesting machine on opposite sides of said main wheel and extending forwardly beneath said platform.

3. In combination, a harvesting machine having an axle and a main wheel journaled thereon, a platform disposed in front of said main wheel, and a plurality of rigidly connected draft members pivotally connected to said axle at points on opposite sides of said main wheel and extending forwardly beneath said platform.

4. In combination, a harvesting machine having an axle and a main wheel journaled thereon, a platform disposed in front of said main wheel, and a plurality of transversely braced, spaced draft members pivotally connected to said axle at points on opposite sides of said main wheel disposed beneath said platform and extending to a point substantially in front of said main wheel.

5. In combination, a harvesting machine having an axle and a main wheel journaled thereon, a platform disposed in front of said main wheel, and a plurality of transversely braced, spaced draft members pivotally connected to said axle at points on opposite sides of said main wheel disposed beneath said platform and extending to a point slightly stubbleward from said main wheel.

6. In combination, a harvesting machine having a main wheel journaled thereon, a platform disposed in front of said main wheel, and a rigid draft member pivotally connected to said harvesting machine on opposite sides of said main wheel having its front end disposed substantially in front of the same and a horizontal portion disposed beneath said platform.

7. In combination, a harvesting machine having a main wheel journaled thereon, a platform disposed in front of said main wheel, and a plurality of rigidly connected draft members pivotally connected to said harvesting machine at points on opposite sides of said main wheel having their front ends substantially in front of the same and having a depressed portion disposed beneath said platform.

8. In combination, a harvesting machine having a main wheel journaled thereon, a platform disposed in front of said main wheel, and a draft member including a plurality of rigidly connected draft members pivotally connected to said harvesting machine at points on opposite sides of said main wheel, said member having a substantially horizontal portion disposed beneath said platform and a forwardly and upwardly extending front end.

In testimony whereof I affix my signature.

CHARLES PEARSON.